Feb. 3, 1970    H. J. BALDWIN    3,492,899
MATERIAL LIMITING DEVICE FOR USE WITH A MATERIAL
CUTTING MACHINE
Filed Aug. 17, 1967
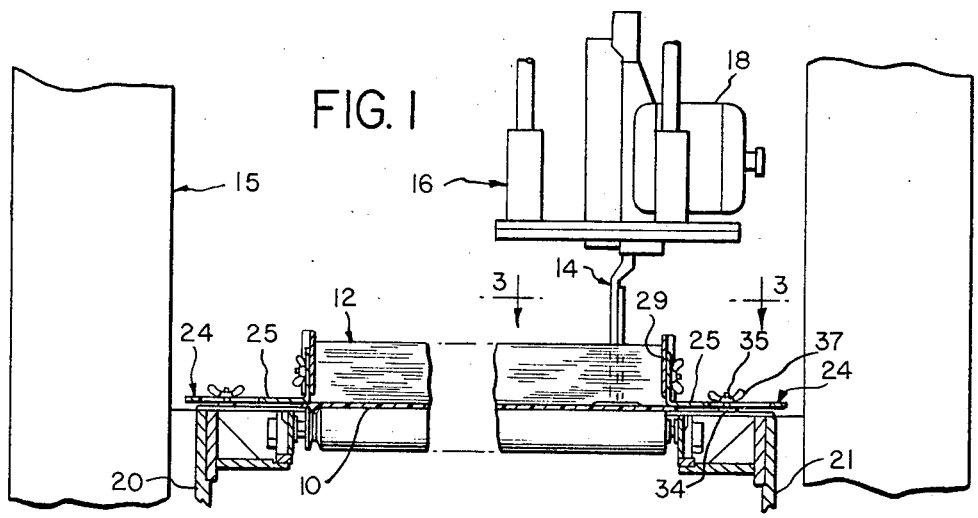
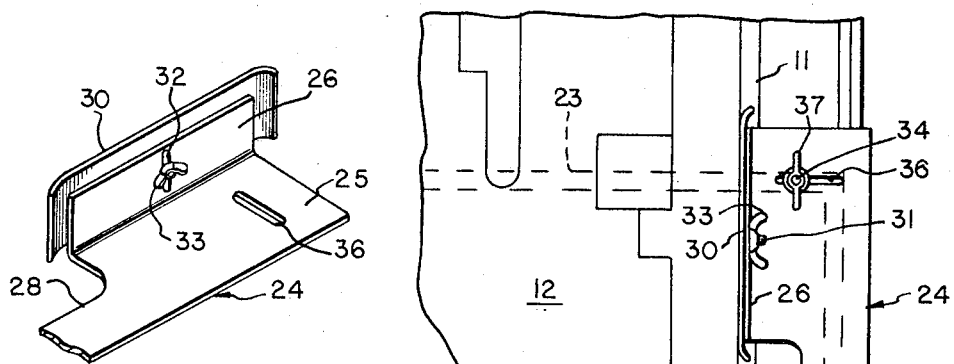
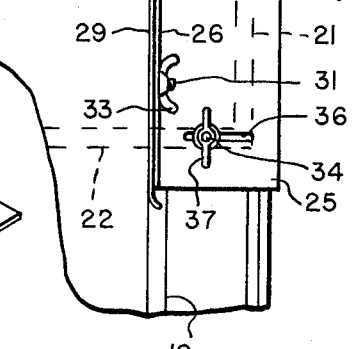
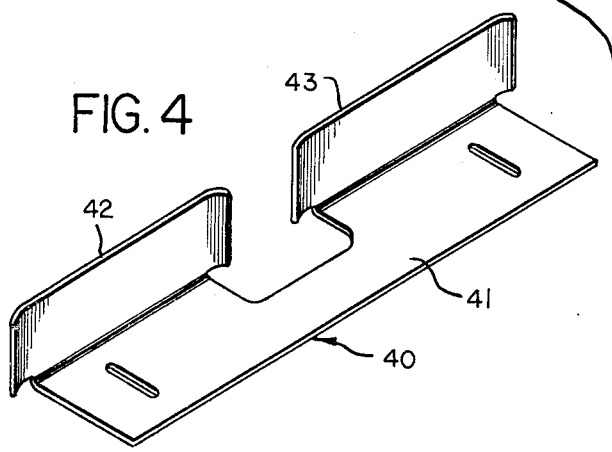
INVENTOR.
HERMAN J. BALDWIN
BY
Frank C. Leach Jr.
ATTORNEY United States Patent Office 3,492,899
Patented Feb. 3, 1970

3,492,899
MATERIAL LIMITING DEVICE FOR USE WITH A MATERIAL CUTTING MACHINE
Herman J. Baldwin, Cincinnati, Ohio, assignor to The Cincinnati Milling Machine Co., Cincinnati, Ohio, a corporation of Ohio
Filed Aug. 17, 1967, Ser. No. 661,251
Int. Cl. B26d 7/16
U.S. Cl. 83—420                                  9 Claims

ABSTRACT OF THE DISCLOSURE

A material cutting machine has a limiting device disposed adjacent at least one of the longitudinal edges of the material being cut by a transversely moving cutting blade to prevent transverse movement of the material by the cutting blade. The limiting device includes a horizontal portion, which is fixedly supported to prevent relative transverse movement between the limiting device and the horizontal bands on which the material is supported, disposed above the tops of the horizontal bands. A pair of vertical members is supported by the horizontal portion for engagement with the adjacent longitudinal edge of the material on each side of the transverse path of the cutting blade. In one embodiment, each of the vertical members is adjustable in accordance with the total thickness of the material being cut. The limiting device is adjustable transversely in accordance with the width of the material being cut.

In material cutting machines of the type shown and described in the copending patent application of George W. Sederberg for "Material Cutting Machine Having Reciprocating Cutting Blade," Ser. No. 636,965, filed May 8, 1965, and assigned to the same assignee as the assignee of the present application, it has been discovered that more efficient use of the machine is obtained when the cutting blade is always rotated in one direction to form the various patterns therein. This also results in maximum utilization of the material being cut.

When utilizing this method of cutting the material, the final cutting operations usually occur adjacent one longitudinal edge of the material being cut. When cutting adjacent this longitudinal edge, there is only a relatively thin strip of the material against which the cutting blade is exerting a force even if the material is relatively heavy. Therefore, the possibility exists that there may be some slight movement of the material by the cutting blade during the final cutting operations when the cutting blade is adjacent the longitudinal edge. As a result, the exact true pattern would not be formed in the portions of the material finally cut.

The present invention satisfactorily overcomes the foregoing problem by providing a device to engage, adjacent the cutting blade, at least one of the longitudinal edges of the material being cut to prevent any transverse movement of the material being cut by the force of the cutting blade. Since the force of the cutting blade is exerted only adjacent the area in which the cutting blade is disposed, the material limiting device of the present invention need only be disposed in areas adjacent the cutting blade and not along the entire length of the longitudinal edge of the material being cut.

While the problem will normally exist only along one of the longitudinal edges of the material being cut, there may be certain instances in which patterns may be formed or the weight of the material may be so light that the material limiting device of the present invention would be required to be disposed adjacent each of the longitudinal edges of the material being cut. Thus, the present invention contemplates employment of the limiting devices on each side of the material being cut.

An object of this invention is to provide a device to maintain a longitudinal edge of material being cut in a desired position even when only a small strip of the total width of the material being cut remains.

Other objects of this invention will be readily perceived from the following description, claims, and drawing.

This invention relates to a material cutting machine having a cutting blade and means to support the cutting blade in a substantially vertical position. The cutting machine has means to support the material to be cut by the cutting blade in a substantially horizontal plane and means to actuate the cutting blade to cause cutting of the material by the cutting blade. The material supporting means and the cutting blade support means are movable relative to each other in a longitudinal direction to move the material on the material supporting means relative to the cutting blade in a longitudinal direction. The cutting blade support means and the material supporting means also are movable relative to each other in a transverse direction and in coordination with the longitudinal relative movement therebetween whereby the cutting blade moves relative to the material in a transverse direction in cutting engagement with the material. The cutting machine has limit means disposed on each side of the cutting blade adjacent at least one of the longitudinal edges of the material being cut with the limit means fixed to prevent transverse movement between the limit means and the material supporting means during cutting of the material by the cutting blade. The limit means is adapted to engage at least one of the longitudinal edges of the material being cut to prevent transverse movement of the material by the cutting blade in a transverse direction toward the limiting device when there is relative transverse movement between the cutting blade and the material supporting means.

The attached drawing illustrates preferred embodiments of the invention, in which:

FIGURE 1 is an end elevational view, partly in section, of a portion of a material cutting machine having the material limiting device of the present invention disposed on each side of the material being cut;

FIGURE 2 is a perspective view of a portion of one embodiment of the limiting device of the present invention;

FIGURE 3 is a top plan view of a portion of the material cutting machine including the limiting device and taken along line 3—3 of FIGURE 2; and FIGURE 4 is a perspective view of another form of the limiting device of the present invention.

Referring to the drawing and particularly FIGURES 1 and 3, there is shown a material cutting machine utilizing the limiting device of the present invention. The cutting machine is of the type shown and described in the aforesaid Sederberg application and includes a pair of endless bands 10 and 11 (see FIGURE 3) on which material 12 is supported. The bands 10 and 11 are driven in unison by a motor to move the material 12 longitudinally as more particularly shown and described in the aforesaid Sederberg application. This material 12 may be a plurality of layers of cloth, for example.

As more particularly shown and described in the aforesaid Sederberg application, a cutting blade 14 is supported from the horizontal portion of a fixed bridge 15 by a support 16. The support 16 is adapted to be moved transversely on the bridge 15 so that the cutting blade 14 moves through a transverse passage 17, which is formed between the adjacent ends of the endless bands 10 and 11. The support 16 also is adapted to rotate the cutting blade 14 about a vertical axis as more particularly shown and described in the aforesaid Sederberg application. The support 16 has an electric motor 18 supported thereon to reciprocate the cutting blade 14.

The movement of the cutting blade 14 in the transverse passage 17, the longitudinal movement of the material 12 relative to the cutting blade 14 by the endless bands 10 and 11, and rotation of the cutting blade 14 about a vertical axis are controlled through a numerical control apparatus as more particularly shown and described in the aforesaid Sederberg application. The cutting blade 14 may have any configuration such as any of those shown in the aforesaid Sederberg application, for example.

The material cutting machine has a table structure extending from each side of the bridge 15 and cooperating therewith to form stationary support means. The details of the table structure are more particularly shown and described in the copending patent application of James G. Wiatt et al. for "Hold Down Apparatus For Material Cutting Machine," Ser. No. 636,968, filed May 8, 1967, and assigned to the same assignee as the assignee of the present application. The table structure includes a box-like structure, which rests on the floor and supports the bridge 15. The box-like structure has side plates or rails 20 and 21 (see FIGURE 1) and end plates or rails 22 and 23 (see FIGURE 3). Thus, a substantially rectangular shaped box-like structure is formed.

As shown in FIGURE 1, a limiting device 24 is disposed on each side of the material 12 for preventing transverse movement of the material 12 by the cutting blade 14 when the cutting blade 14 moves transverse to the material 12. The limiting device 24 includes a horizontal support portion 25, which is adapted to be disposed in a horizontal plane just above the plane having the tops of the endless bands 10 and 11 as shown in FIGURE 1 for the band 10. The horizontal support portion 25 has a pair of upstanding portions 26 (see FIGURE 3) at one side thereof and substantially perpendicular to the portion 25. The portions 26 are disposed on opposite sides of a cut out portion 28 in the support portion 25. The cut out portion 28 is disposed adjacent the transverse passage 17 to accommodate any extreme transverse movements of the cutting blade 14.

The limiting device 24 also has plates 29 and 30 adjustably mounted on the upstanding portions 26 of the horizontal support portion 25. Each of the plates 29 and 30 has a threaded stud 31 extending therefrom for disposition in a vertical slot 32 (see FIGURE 2) in the upstanding portion 26 of the horizontal support portion 25 on which it is mounted. A wing nut 33 cooperates with each of the threaded studs 31 to lock each of the plates 29 and 30 in a vertically adjusted position in accordance with the total thickness of the material 12.

The limiting device 24 is supported on studs 34, which extend upwardly from the end plates 22 and 23 of the box-like structure of the material cutting machine exterior of the endless bands 10 and 11. Each of the studs 34 has a reduced threaded portion 35 (see FIGURE 1) on its upper end for disposition within a transverse slot 36 (see FIGURES 2 and 3) in the horizontal support portion 25. A wing nut 37 cooperates with each of the threaded portions 35 of the stud 34 to lock the limiting device 24 in the desired horizontal position.

Thus, the horizontal position of the limiting device 24 may be adjusted through releasing the wing nuts 37 and sliding the limiting device 24 transversely due to the transverse slots 36, which are disposed parallel to the transverse passage 17. This insures that the plates 29 and 30 remain substantially perpendicular to the transverse passage 17 and are disposed substantially parallel to the longitudinal edge of the material 12.

Considering the operation of the material cutting machine when using the material limiting device 24 of the present invention, it is necessary to cut a longitudinal edge along the material 12 to insure that the edge of the material 12 is disosed in a longitudinal direction. With the material 12 disposed on the endless bands 10 and 11, the limiting device 24 is moved transversely by releasing the wing nuts 37 until the plates 29 and 30 engage the longitudinal edge of the material 12. If the limiting devices 24 are utilized on both the longitudinal edges of the material 12 as shown in FIGURE 1, then both of the limiting devices 24 must be appropriately adjusted.

Before the limiting devices 24 have the plates 29 and 30 moved into engagement with the longitudinal edge or edges of the material 12, the plates 29 and 30 are vertically adjusted in accordance with the total thickness of the material 12 being cut. This is accomplished by releasing the wing nuts 33 and moving the plates 29 and 30 through the studs 31 being disposed in the vertical slots 32 in the upstanding portions 26 to position the plates 29 and 30 at the desired vertical position relative to the top of the material 12.

By disposing the horizontal support portion 25 of the limiting device 24 in a horizontal plane above the plane containing the tops of the endless bands 10 and 11, the limiting device 24 may be easily moved over the top of the endless bands 10 and 11. This is necessary since the width of the material 12 may vary substantially and does not normally extend the entire width of the endless bands 10 and 11.

The horizontal portion 25 of the limiting device 24 does not extend in a longitudinal direction for a substantial distance beyond the transverse passage 17. This is because it is only in this area that the force of the cutting blade 14 tends to cause any transverse movement of the material 12.

It should be understood that it may be necessary to have more than one size of the limiting devices 24. That is, because of the support standards of the bridge 15, the total amount of movement of the limiting devices 24 away from the endless bands 10 and 11 is limited. Thus, in order to accommodate a relatively small width of the material 12, the horizontal support portion 25 of the limiting device 24 would have to be of much greater width than is presently shown in FIGURE 3.

Referring to FIGURE 4, there is shown a limiting device 40. The limiting device 40 has a substantially horizontal support portion 41, which is adapted to be supported by the studs 34 in the same manner as the support portion 25 of the limiting device 24. Thus, the limiting device 40 is transversely adjustable in accordance with the width of the material 12 being cut.

However, the limiting device 40 does not have any vertical adjustment. Instead, upstanding portions 42 and 43, which are disposed on opposite sides of the cutting blade 14, extend upwardly from the support portion 41. The upstanding portions 42 and 43 engage the longitudinal edge of the material 12 on the opposite sides of the cutting blade 14 to function in the same manner as the plates 29 and 30 of the limiting device 24. Again, as mentioned with respect to the limiting device 24, various sizes of the limiting devices 40 would be required to accommodate different widths of the material 12. Thus, the maximum amount of horizontal adjustment is limited because of the position of the support standards of the bridge 15 as previously mentioned.

While the material limiting devices of the present invention have been described as being utilized with the material cutting machine of the aforesaid Sederberg application, it should be understood that they may be readily employed with any other type of material cutting machine in which there is relative movement between the material and the cutting means. If the longitudinal movement of the material relative to the cutting means should be of the type shown and described in U.S. Patent 3,262,348 to James G. Wiatt et al., for example, it would be necessary to mount the limiting device 24 or 40 of the present invention on the carriage, which moves longitudinally relative to the frame.

An advantage of this invention is that it prevents transverse movement of the material due to the force of the cutting blade. Another advantage of this invention is that it insures that the final portions of a pattern being cut in material are true.

For purposes of exemplification, particular embodiments of the invention have been shown and described according to the best present understanding thereof. However, it will be apparent that changes and modifications in the arrangement and construction of the parts thereof may be resorted to without departing from the spirit and scope of the invention.

What is claimed is:

1. A material cutting machine comprising:
   a cutting blade;
   means to support said cutting blade in a substantially vertical position;
   means to support material in a substantially horizontal plane to be cut by said cutting blade;
   means to actuate said cutting blade to cause cutting of the material by said cutting blade;
   said material supporting means and said cutting blade support means being movable relative to each other in a longitudinal direction to move one of the material on said material supporting means and said cutting blade relative to the other in a longitudinal direction;
   said cutting blade support means and said material supporting means being movable relative to each other in a transverse direction in coordination with the longitudinal relative movement therebetween whereby one of the material and said cutting blade moves relative to the other in a transverse direction;
   a limiting device disposed adjacent at least one of the longitudinal edges of the material being cut;
   said limiting device including horizontal support means and a pair of vertical members supported by said horizontal support means, said horizontal support means being supported so that said vertical members are disposed on opposite sides of the transverse path of said cutting blade;
   said horizontal support means of said limiting device being fixed to prevent transverse movement between said limiting device and said material supporting means during cutting of the material by said cutting blade; and
   said vertical members of said limiting device continuously engaging the adjacent longitudinal edge of the material being cut during any longitudinal movement of the material to prevent transverse movement of the material by said cutting blade in a transverse direction toward said limiting device when there is relative transverse movement between said cutting blade and said material supporting means.

2. The material cutting machine according to claim 1 in which one of said limiting device is disposed adjacent each longitudinal edge of the material being cut to prevent transverse movement of the material by said cutting blade in both transverse directions.

3. The material cutting machine according to claim 1 including:
   stationary support means;
   said stationary support means supporting said cutting blade support means for only transverse movement and said material supporting means for only longitudinal movement whereby only said cutting blade support means moves in a transverse direction and only said material supporting means moves in a longitudinal direction; and
   said limiting device being supported by said stationary support means.

4. The material cutting machine according to claim 3 in which said limiting device includes
   horizontal means disposed in a horizontal plane above the horizontal top of said material supporting means;
   two vertical members extending from said horizontal means with said vertical members being disposed on opposite sides of the transverse path of said cutting blade; and
   means to adjustably mount said horizontal means on said stationary support means for movement in a transverse horizontal direction to move said vertical members into engagement with the adjacent longitudinal edge of the material being cut.

5. The material cutting machine according to claim 1 in which said horizontal support means of said limiting device includes means transversely adjustable in a horizontal plane in accordance with the position of the longitudinal edge of the material to be engaged by said limiting device.

6. The material cutting machine according to claim 2 in which said horizontal support means of each of said limiting devices includes means transversely adjustable in a horizontal plane in accordance with the position of the adjacent longitudinal edge of the material.

7. A material cutting machine comprising:
   a cutting blade;
   means to support said cutting blade in a substantially vertical position;
   means to support material in a substantially horizontal plane to be cut by said cutting blade;
   means to actuate said cutting blade to cause cutting of the material by said cutting blade;
   said material supporting means and said cutting blade support means being movable relative to each other in a longitudinal direction to move one of the material on said material supporting means and said cutting blade relative to the other in a longitudinal direction;
   said cutting blade support means and said material supporting means being movable relative to each other in a transverse direction in coordination with the longitudinal relative movement therebetween whereby one of the material and said cutting blade moves relative to the other in a transverse direction;
   limit means disposed on each side of said cutting blade adjacent at least one of the longitudinal edges of the material being cut;
   said limit means including means adjustable in a vertical plane in accordance with the total thickness of the material being cut;
   said limit means being fixed to prevent transverse movement between said limit means and said material supporting means during cutting of the material by said cutting blade; and
   said limit means adapted to engage at least one of the longitudinal edges of the material being cut to prevent transverse movement of the material by said cutting blade in a transverse direction toward said limit means when there is relative transverse movement between said cutting blade and said material supporting means.

8. The material cutting machine according to claim 7 in which said limit means includes means transversely adjustable in a horizontal plane in accordance with the position of the longitudinal edge of the material to be engaged by said limit means.

9. The material cutting machine according to claim 7 including:
   stationary support means;
   said stationary support means supporting said cutting blade support means for only transverse movement and said material supporting means for only longitudinal movement whereby only said cutting blade support means moves in a transverse direction and only said material supporting means moves in a longitudinal direction;
   said limit means being supported by said stationary support means;
   said limit means including:

horizontal means disposed in a horizontal plane above the horizontal top of said material supporting means;

two vertical members extending from said horizontal means with said vertical members being disposed on opposite sides of the transverse path of said cutting blade; and means to adjustably mount said horizontal means on said stationary support means for movement in a transverse horizontal direction to move said vertical members into engagement with the adjacent longitudinal edge of the material being cut; and each of said vertical members being vertically adjustable relative to said horizontal means in accordance with the total thickness of the material being cut.

References Cited

UNITED STATES PATENTS

| 427,098 | 5/1890 | Meriam | 83—449 X |
| 2,163,967 | 6/1939 | Strawn et al. | 83—319 X |
| 2,312,971 | 3/1943 | Norrid | 83—614 X |
| 2,378,428 | 6/1945 | Odian | 83—487 |
| 3,141,367 | 7/1964 | Keener et al. | 83—420 |

FOREIGN PATENTS 619,648   5/1961   Canada.

JAMES M. MEISTER, Primary Examiner

U.S. Cl. X.R.

83—421, 427, 428, 449